United States Patent [19]

Mizuno et al.

[11] Patent Number: 4,969,109
[45] Date of Patent: Nov. 6, 1990

[54] ROBOT CONTROL APPARATUS

[75] Inventors: Tohru Mizuno, Tama; Haruyuki Ishikawa, Shinjuku, both of Japan

[73] Assignee: Fanuc Ltd, Minamitsuru, Japan

[21] Appl. No.: 243,339

[22] PCT Filed: Jan. 7, 1988

[86] PCT No.: PCT/JP88/00010
§ 371 Date: Jul. 22, 1988
§ 102(e) Date: Jul. 22, 1988

[87] PCT Pub. No.: WO88/05186
PCT Pub. Date: Jul. 14, 1988

[30] Foreign Application Priority Data
Jan. 7, 1987 [JP] Japan .................. 62-001529

[51] Int. Cl.$^5$ .............. G09C 15/00; G09L 15/00; G06F 15/20; G06G 7/48
[52] U.S. Cl. ................................ 364/513; 364/468; 364/478; 901/2; 901/50; 414/788
[58] Field of Search ............ 364/167.01, 174, 175, 364/474.01, 474.02, 474.03, 474.2, 474.28, 474.34, 474.35, 513, 468, 478; 901/2-18, 50; 414/273, 275, 286, 902, 788-798

[56] References Cited

U.S. PATENT DOCUMENTS

| | | | |
|---|---|---|---|
| 4,433,382 | 2/1984 | Cunningham | 364/474.34 |
| 4,445,184 | 4/1984 | Noguchi | 364/191 |
| 4,480,953 | 11/1984 | Baba | 414/790.8 |
| 4,540,325 | 9/1985 | Heisler | 414/789.8 |
| 4,641,271 | 2/1987 | Konishi et al. | 364/513 |

FOREIGN PATENT DOCUMENTS 49-119085  11/1974  Japan .
54-118057  3/1978  Japan .

Primary Examiner—Jerry Smith
Assistant Examiner—Jim Trammell
Attorney, Agent, or Firm—Staas & Halsey

[57] ABSTRACT

A robot control apparatus is provided, including a for storing a plurality of approach patterns related to hand movement for when workpieces gripped by a robot hand are stacked and unstacked at predetermined locations. Approach pattern from a position at which movement of the robot hand starts to a motion position at which a workpiece is stacked or unstacked, and from this motion position to a position at which movement of the robot hand ends can be selected at will depending upon the type of workpiece and the motion position.

5 Claims, 6 Drawing Sheets

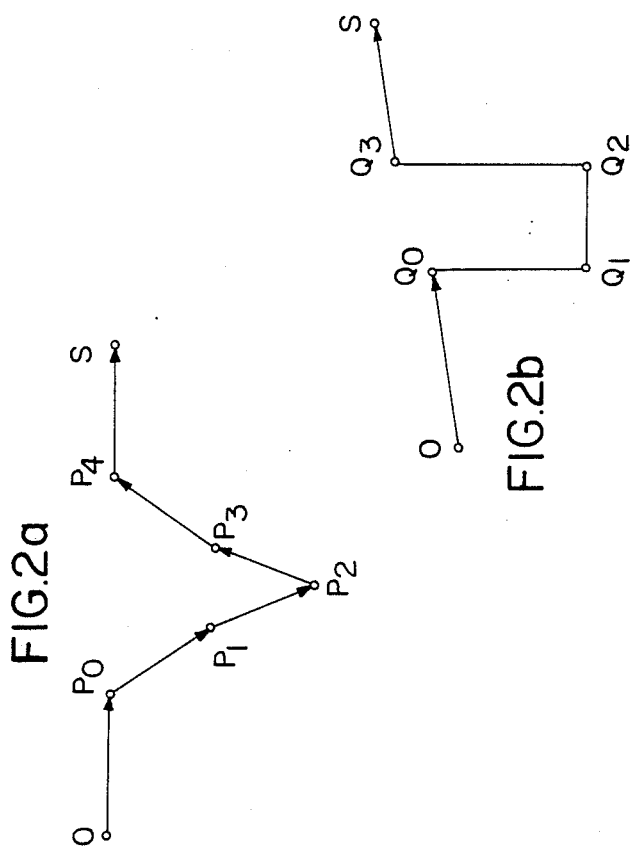
FIG.2a
FIG.2b
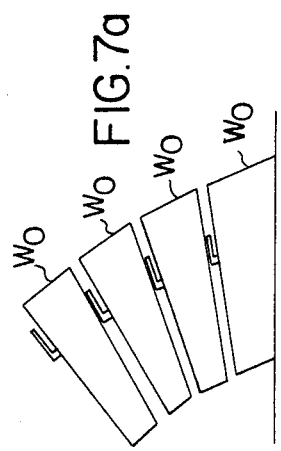
FIG.7a
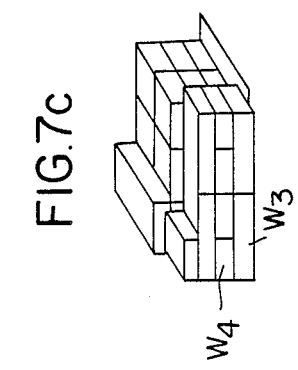
FIG.7c
FIG.7b

ROBOT CONTROL APPARATUS

BACKGROUND OF THE INVENTION

This invention relates to a robot control apparatus having a palletizing function.

Generally, in order for a robot A shown in FIG. 3 to carry out a palletizing operation to automatically stack and unstack workpieces, a robot control apparatus having a prescribed palletizing function is required. This robot is constructed for control along six axes, namely a $\theta$ axis, V axis, U axis, $\alpha$ axis, $\beta$ axis and $\gamma$ axis, and performs palletizing by gripping workpieces by means of a hand.

An example of a palletizing operation will now be described with reference to FIGS. 4 through 6. If workpieces W are to be stacked in the n rows, m columns and l levels shown in FIG. 4 by a palletizing operation, first the palletizing positions P1, Q111, Qn11, Q1m1, Qnm1, Q11l, R1 are defined wherein n: Number of Workpiece Rows
m: Number of Workpiece Columns
l: Number of Workpiece Levels
P1: Point Above First Row, First Column
Q11l: Workpiece Position in First Row, First Column, l'th Level
Q1m1: Workpiece Position in First Row, m-th Column, First Level
Qnm1: Workpiece Position in n-th Row, m-th Column, First Level
Q11l: Workpiece Positional in First Row, First Column, First Level
R1: Palletizing End Point.

Then pelletizing is executed by software prepared in accordance with a predetermined program.

By way of example, an operation for stacking a workpiece at a point Qijk shown in FIG. 6 is performed through the following sequence:

(1) The robot hand is moved from a position at point 0, which is occupied prior to the start of palletizing, to a point Pij. The point Pij is set in such a manner that vectors $\overline{Q111P1}$ and $\overline{QijlPij}$ will be equal.

(2) The hand is moved along a straight line from the point Pij to the point Qijk.

(3) The workpiece is stacked at the point Qijk.

(4) The hand is moved along a straight line from the point Qijk to a point Rij. The position of Rij is set in such a manner that vectors $\overline{Q111R1}$ and $\overline{Qij1Rij}$ will be equal.

(5) The hand is moved from the point Rij to a position S which the hand occupies at the conclusion of palletizing.

The attitude of the hand at the points Pij, Rij is made to coincide with that at points P1, R1, and the attitude of the hand at the point Qijk is made to coincide with that at point Q111.

Thus, with a robot control apparatus having this conventional palletizing function, the robot is controlled on the assumption that workpieces of the same shape as shown in FIG. 4 are to be stacked and unstacked in a fixed pattern.

However, there are instances when it is necessary to perform palletizing while changing the attitude of the robot hand from one level to the next even though the workpieces are identical in shape, as in a case where a palletizing reference position shifts in accordance with stacking, as with automobile doors Wo shown in FIG. 7(a), or in a case where workpieces W1, W2 having different sizes as shown in FIG. 7(b) are stacked, or workpieces W3, W4, the sizes of which differ from one level to the next, are stacked, as depicted in FIG. 7(c). Furthermore, in order to control movement in such a manner that the robot hand will not interfere with a workpiece stacked previously, it is necessary to prepare a variety of motion patterns in advance and perform the operation while changing the motion pattern for each workpiece. However, a robot control apparatus having the conventional palletizing function cannot cope with these situations.

SUMMARY OF THE INVENTION

The present invention solves the foregoing problems and its objects are to provide a robot control apparatus capable of suitably selecting array patterns in which workpiece arrays differ from one level to the next and motion patterns which avoid interference with other workpieces, these features being difficult to achieve with the conventional palletizing function, and to reduce teaching labor and required memory capacity.

In accordance with the present invention, there is provided a control apparatus for a robot which performs a palletizing operation for stacking or unstacking workpieces, which are gripped by a robot hand, at predetermined locations. The apparatus includes memory means for storing a plurality of approach patterns for approach from a position at which robot hand movement starts to a motion position at which a workpiece is stacked or unstacked, and from the motion position to a position at which movement of the robot hand ends; arithmetic means for selecting the approach patterns depending upon the motion position and for computing a robot hand motion path for each workpiece; and means for commanding the robot to perform a palletizing motion based on the computed motion path.

Accordingly, by expanding the palletizing function, the robot control apparatus of the invention sets various motion patterns and stacks workpieces by changing the attitude of the hand. As a result, control can be performed to adjust for any change in reference point and stacking is possible in which workpieces do not interfere with one another. The same effects are obtained even when unstacking workpieces.

BRIEF DESCRIPTION OF THE DRAWINGS

FIGS. 2(a), (b) are schematic views illustrating examples of motion patterns according to the present invention; FIGS. 7(a) through (c) are schematic views illustrating various examples of stacking workpieces.

DETAILED DESCRIPTION OF THE PREFERRED EMBODIMENTS

Embodiments of the present invention will now be described in detail with reference to the drawings.

Figure 1A:
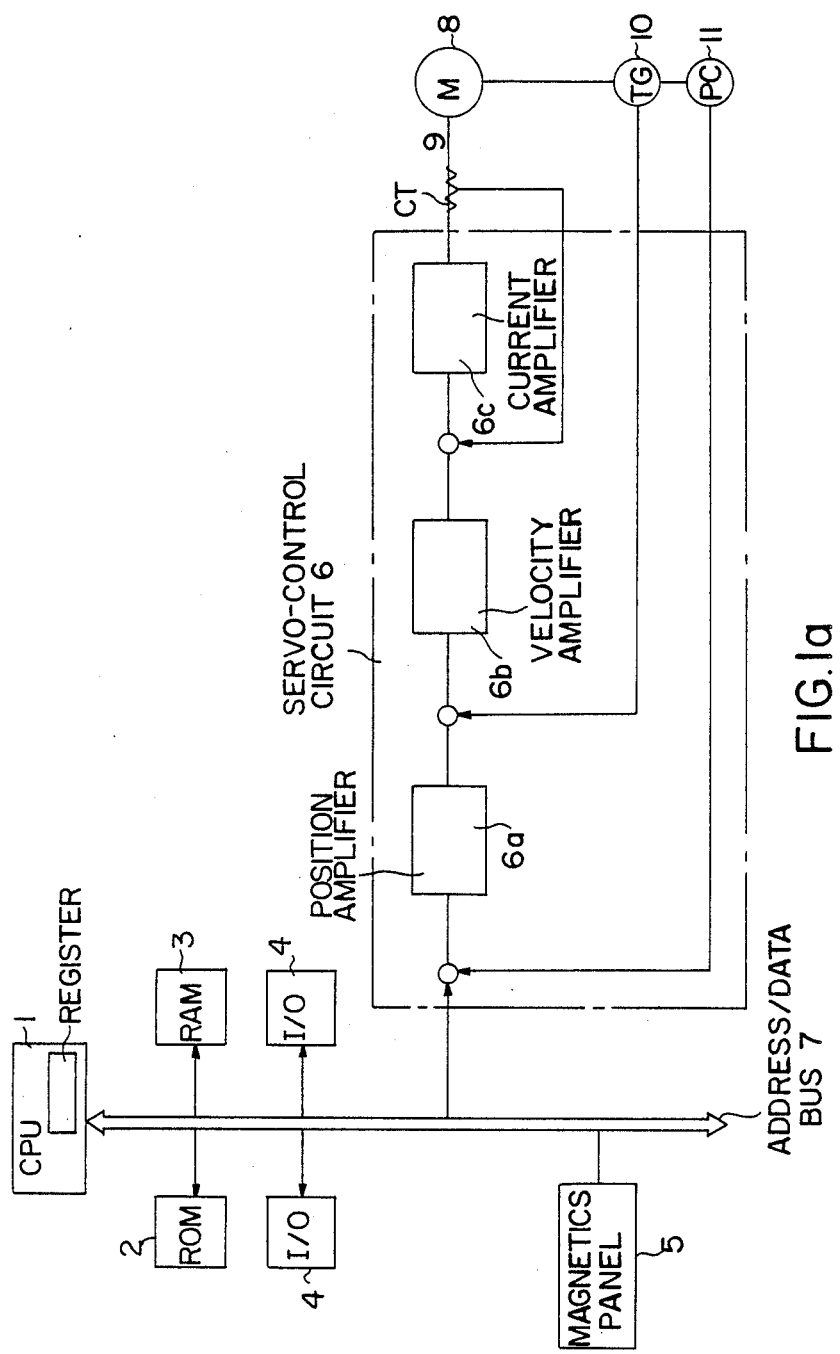
FIG. 1(a) is a block diagram illustrating the general features of a robot control apparatus according to the present invention.

FIG. 1(a) is a block diagram illustrating the general construction of a robot control apparatus according to the present invention. The robot control apparatus includes a CPU 1 having an internal register array. The CPU 1 is connected by an address/data bus 7 to a memory ROM 2, a RAM 3, input/output parts (I/O) 4, a magnetics panel 5 and a servo-control circuit 6. The ROM 2 stores a control program for performing overall robot control, and the RAM 3 stores a taught motion program, taught data, command data, and the like.

The servo-control circuit 6 has a position amplifier 6a, velocity amplifier 6b and current amplifier 6c. A servomotor 8, controlled by the servo-control circuit 6 to perform drive along each axis, is provided with a current detector 9 constituted by a current transformer CT, a velocity detector 10 constituted by a tachogenerator TG, and a position detector 11 constituted by a pulse coder PC. By using the detected values of the detectors 9 through 11, a current loop, velocity loop and position loop are formed to carry out prescribed control of the servomotor 8.

The servomotor 8 is provided for each of the controlled axes. In this case, six of these servomotors are provided for driving the respective axes of the robot, and the servo-control circuit 6 connected to the address/data bus 7 is mounted on each of these servomotors.

In the present invention, the program is written to include only a G code, which indicates position at which palletizing motion starts, and the corresponding operand. Data specifying actual motion is stored in separate files. In connection with program execution, a file designated by the operand is utilized, with the file name (file number) serving as an argument. Accordingly, when teaching the robot palletizing data, the palletizing command is set in a menu format from a command display, and position data, approach format, and the like, regarding a workpiece on the floor are designated.

Figure 1B:
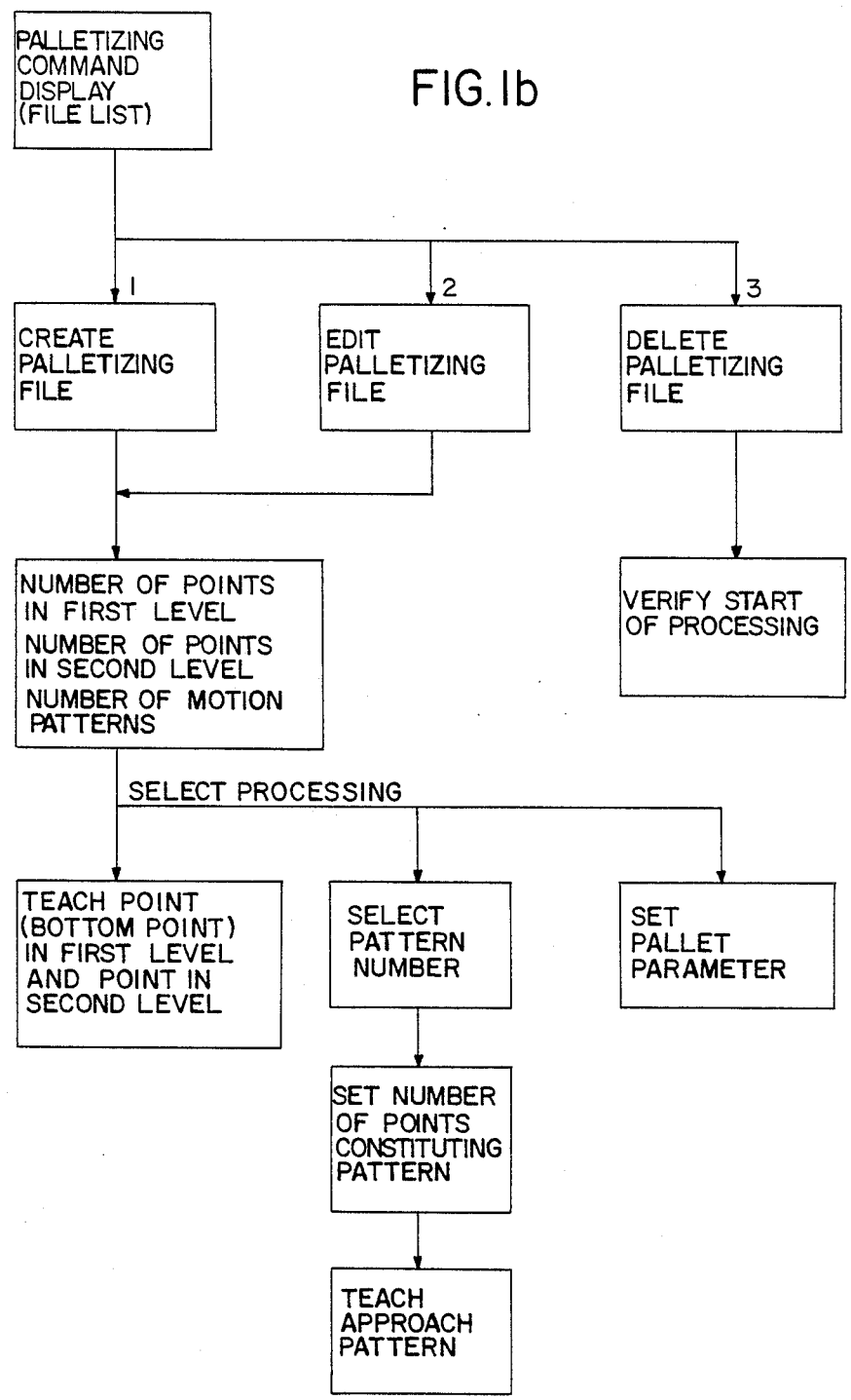
FIG. 1(b) is a flowchart illustrating the general features of motion pattern registration.

FIG. 1(b) is a flowchart illustrating the general features of palletizing motion pattern registration performed using a command display. Teaching is carried out in the following manner by teaching a G code and an operand on an ordinary program display, and registering palletizing motion patterns from a command display:

Let 0 represent a movement starting point and S a movement end point. Various motion patterns inclusive of a plurality of junction points, such as a pattern of palletizing motion traversing a path P0-P1-P2-P3-P4 [FIG. 2(a)] and a motion pattern traversing a path Q0-Q1-Q2-Q3 [FIG. 2(b)], are stored in the RAM 3, thereby preparing a robot control pattern. The teaching of these various motion patterns will now be described.

Figure 1D:
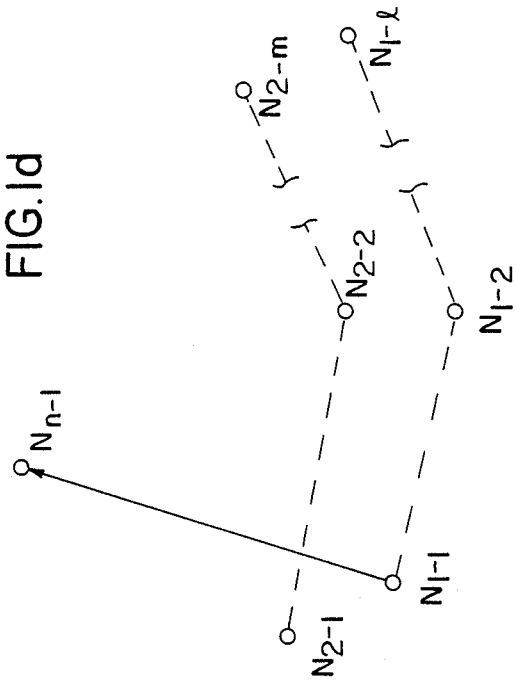
FIG. 1(d) is a schematic view illustrating grip point calculation.
Figure 1C:
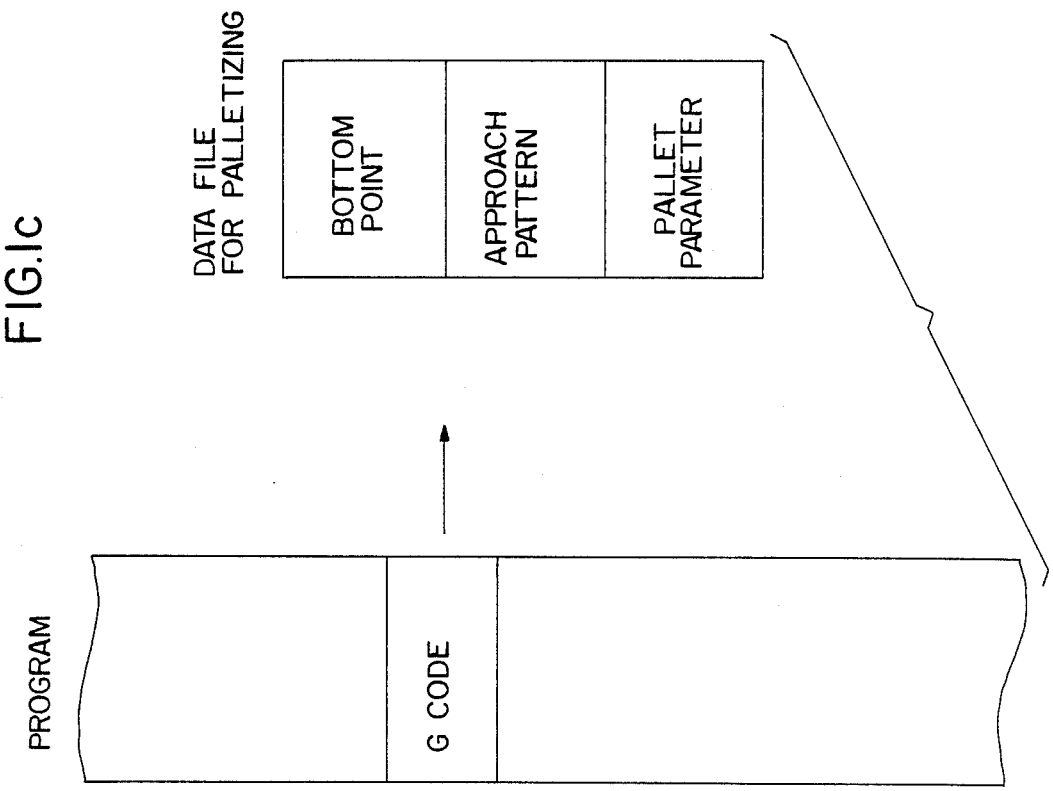
FIG. 1(c) is a schematic view illustrating an execution procedure of a program at playback.
Figure 3:
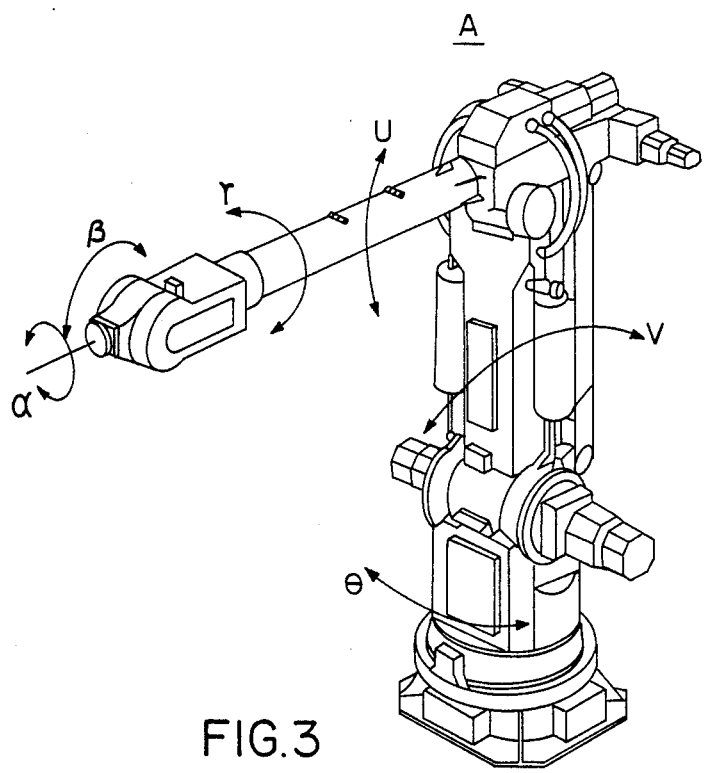
FIG. 3 is a perspective view of a robot.
Figure 6:
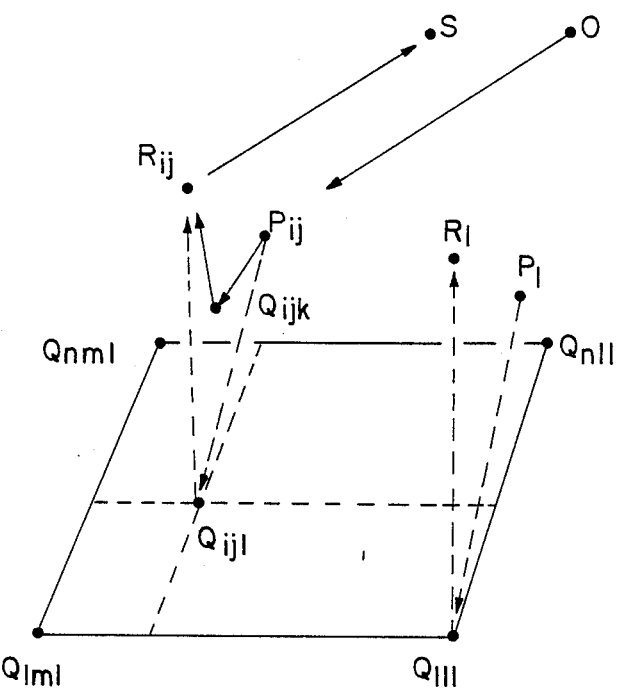
FIGS. 5 and 6 are schematic views illustrating palletizing motions according to an example of the prior art.

FIG. 1(c) is a view illustrating an example of a teaching program. The program is written to include a G code and an operand for indicating a position at which palletizing motion is to start. Data specifying actual motion is stored in separate files. A palletizing data file is prepared by selecting a predetermined program display and then using this display. Data relating to (1) a bottom point (grid point), (2) an approach pattern and (3) pallet parameters are taught set and stored in a file.

A bottom point is a position at point P2 in the example of FIG. 2(a) and represents a typical point for stacking workpieces. An approach pattern refers to a motion pattern which includes a plurality of junction points between the movement starting point 0 and movement end point S. If a plurality of motion patterns are set for a particular workpiece, selection can be made by pattern number from among motion patterns such as the motion pattern shown in FIG. 2(a), the motion pattern shown in FIG. 2(b), etc. The number of motion points constituting a selected pattern can also be designated.

In the example of FIG. 2(a), there are five points, namely P0-P4. Though the number of points forming a pattern can be selected at will, the maximum value is limited, as to a value of 16, by way of example.

The following parameters can be set as pallet parameters:

(1) Palletizing point data

This is a parameter for deciding displacement in the height direction of workpiece stacking and is determined by the amount of displacement along the Z axis or the amount of displacement in the vector direction.

(2) Hand orientation data

This is a parameter regarding a height limitation upon robot hand retraction after workpiece stacking. This value determines whether there is to be a transition to the next palletizing motion from the same height or whether a different height is to be set for each stacking level.

(3) Moving pattern data

This is a parameter relating to a method of deciding hand attitude at a partitioning point and decides whether to fix the system to a pulse at a representative point, whether to equally divide the attitude vector at the representative point equally by a fixed pulse number or by the rotation of the attitude vector.

(4) Register control data

Figure 4:
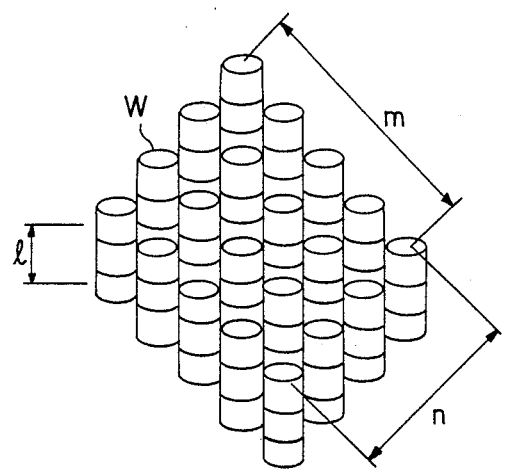
FIG. 4 is a schematic view illustrating an example of a workpiece array.
Figure 5:
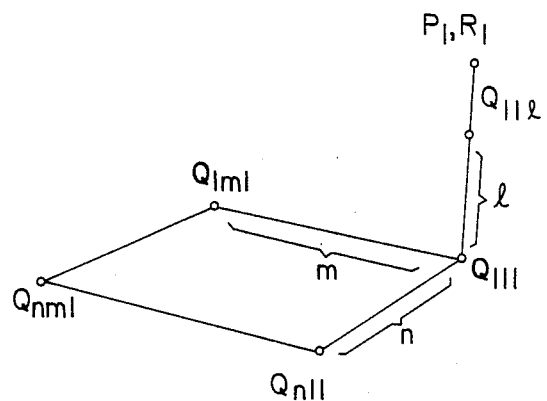

This is a parameter relating to whether or not a register which sets the remaining number of workpieces is automatically decremented. In a case where workpieces are stacked and unstacked equally at each level, as in the palletizing operation shown in FIG. 4, the workpiece number set in the register is automatically decremented. In a case where a workpiece W4 is stacked at every other level, as in the palletizing operation of FIG. 7(c), or in a case where the way in which stacking is performed is changed, automatic decrementing is not carried out.

Path computation performed at playback based on the various set parameters and data will now be described.

In order to compute the coordinates of grid points with regard to each workpiece, block numbers N1−1, Nn−1 serve as references. Block numbers N are assigned by a level number−number combination in order starting from the leading block. As shown in FIG. 1(d), workpiece stacking positions are set as N1−1, N1−2, ... N1−l with regard to the first level, N2−1, N2−2, ... N2−m with regard to the second level, and the grid point Nn−1 at the uppermost level. At such time, all grid points are computed by any of the following procedures. The program display screen has a display resembling an ordinary one, and only the display of the block number and the display of the motion pattern number differ. The total number of points displayed is the sum of the number of workpieces in the first level and the number of workpieces in the second level set by the previous display. A value of from 1 to the number of patterns set by the previous display can be used as a pattern number. The taught data can be inputted by the two methods of present position teaching and MDI teaching. The method of processing the inputted data can be any of the following three and designation is possible depending upon the robot model and parameter:

(1) partition only the Z-axis value;
(2) partition only the Z-coordinate value; and
(3) partition $\overline{N1-1 \ Nn-1}$ vector.

As for the hand attitude at the grid point Q, it is possible to select any of the following, in which designation can be made depending upon the robot model and the parameter set as the moving pattern data:

(1) fix to the hand attitude at the grid point N1−1;
(2) fix to the hand attitude at the taught point of the underlying level corresponding to the workpiece;
(3) partition the increment of the control pulses for each robot hand axis from the grid point N1−1 to the grid point Nn−1, and decide by adding successively; and
(4) partition the change in rotation about each axis of the reference coordinates from the grid point N1−1 to the grid point Nn−1, and add.

In order to decide a palletizing motion pattern, as in the example of FIG. 2(a), the fundamental form obtains |P0, P1,... (motion points of the vector display) in accordance with $$|P0 = |Q + \overrightarrow{P2P1}$$
$$|P1 = |Q + \overrightarrow{P2P1}$$
$$\vdots$$

after the grid point Q is computed. It should be noted that it is possible to determine the starting point |P0 and end point |P4 of pattern motion in the following manner, rather than using the fundamental form. If, with regard to a workpiece of an upper level, the positions of the starting point and end point thereof rise, the set stroke is exceeded or the robot hand performs wasteful motion. The present invention prevents these inconveniences encountered with the abovementioned fundamental form.

First, when deciding a starting point (or end point), $\overrightarrow{P2P0}$ (or $\overrightarrow{P2P4}$) is added to the grid point (i.e. a taught point) of the lowermost level corresponding to the particular workpiece.

The starting point (or end point) uses the taught point of the pattern as is.

The above teaching method can be carried out by key input while successively changing over the CRT display.

When a G code G77 for expanded palletizing is in the program of FIG. 1(c) at the time of playback, a link buffer is prepared at a predetermined location in the RAM 3 corresponding thereto. At such time, operands 1, 2 contained in the G code are treated as indeces, a predetermined palletizing file and register are called, and the link buffer is created in real time based on these data.

Though an embodiment of the present invention has been described, the invention is not limited thereto but can be modified in various ways without departing from the scope of the claims.

The robot control apparatus of the present invention improves upon the control function of palletizing motions performed by a robot and contributes to automation of processes in manufacturing fields that deal with workpieces of diverse kinds.

We claim:

1. A robot control apparatus for performing a palletizing operation of stacking or unstacking workpieces, which are gripped by a robot hand, at predetermined locations, comprising:
   (a) a plurality of same or different sized workpieces;
   (b) a robot movable three dimensionally;
   (c) a hand connected to the robot and capable of being moved into different attitudes during stacking or unstacking;
   (d) memory means for storing a plurality of patterns for approach from a position at which movement of the robot hand starts to a motion position at which a workpiece is stacked or unstacked, and from the motion position to a position at which movement of the robot hand ends;
   (e) arithmetic means for selecting said approach patterns depending upon the motion position and for computing a robot hand motion path for each workpiece;
   (f) means for commanding the robot to perform a palletizing motion based on the computed motion path; and
   (g) means for changing and setting for each workpiece an attitude of the robot hand at said motion position.

2. A robot control apparatus according to claim 1, further comprising:
   (d) means for changing and setting a number of junction points constituting said approach patterns.

3. A robot control apparatus according to claim 1, further comprising:
   (d) means for designating and editing said approach patterns from a command display screen based on a file list.

4. A robot control apparatus according to claim 3, wherein said designating and editing means comprises means for setting taught data of bottom points expressing representative points of workpiece stacking.

5. A robot control apparatus according to claim 3, wherein said designating and editing means comprises means for setting parameters related to hand attitude.

* * * * *